(Model.)

D. B. WEIGHTMAN.
CURRY COMB.

No. 309,668.              Patented Dec. 23, 1884.

WITNESSES:
Donn Twitchell.
C. Sedgwick.

INVENTOR:
D. B. Weightman
BY Munn & Co.
ATTORNEYS.

UNITED STATES PATENT OFFICE.

DAVID B. WEIGHTMAN, OF GRAND RAPIDS, MICHIGAN.

CURRY-COMB.

SPECIFICATION forming part of Letters Patent No. 309,668, dated December 23, 1884.

Application filed April 28, 1884. (Model.)

*To all whom it may concern:*

Be it known that I, DAVID B. WEIGHTMAN, of Grand Rapids, in the county of Kent and State of Michigan, have invented a new and Improved Curry-Comb, of which the following is a full, clear, and exact description.

The object of my invention is to provide a cheap, durable, and efficient curry-comb.

The invention consists of the detailed construction and combination of parts, substantially as hereinafter fully set forth, and pointed out in the claim.

Reference is to be had to the accompanying drawings, forming part of this specification, in which similar letters of reference indicate corresponding parts in both the figures.

Figure 1:
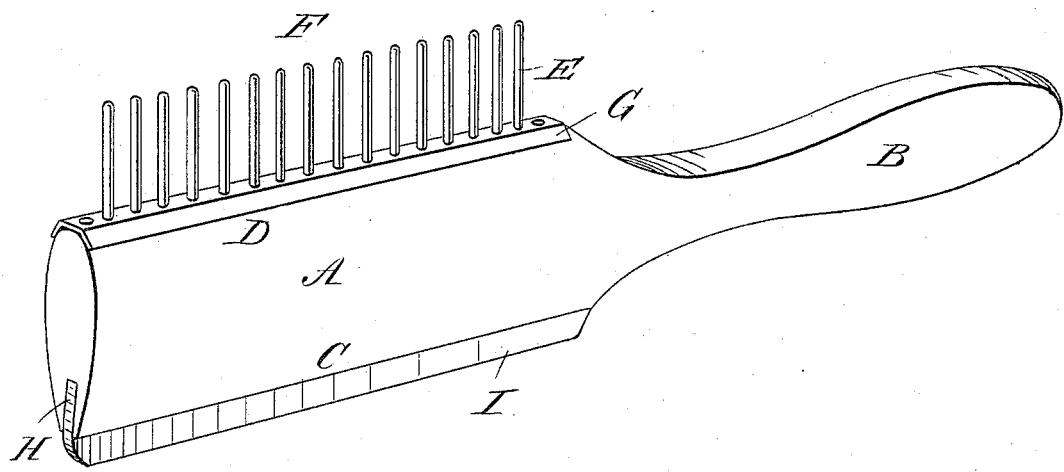
Figure 2:
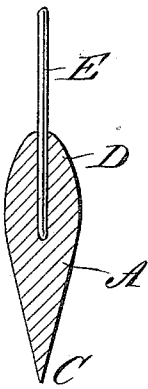

Figure 1 is a perspective view of one of my improved curry-combs, having a rubber strip secured in its thin edge and provided with a facing-strip; and Fig. 2 is a cross-section of the same, but without the rubber or the facing-strip.

A indicates the body, and B is the handle, of my curry-comb, formed in one piece out of any wood suitable for the purpose. One edge, C, of the body is tapered to a sharp edge, to form a scraping-blade; and into the other edge, D, which may be finished in any desired outline, are inserted, in suitable holes made for the purpose, pieces E, of wire, preferably steel, to form the teeth for the comb proper, F, which teeth are entered sufficiently into the body to be firmly held therein. A sheet-metal facing, G, preferably of tin, and suitably apertured for the teeth, may be secured upon the edge D, to strengthen the said edge and prevent it from splitting in use. A longitudinal groove, H, may be formed in the edge C, into which groove a strip, I, of rubber or analogous material, may be secured.

This curry-comb is simple, durable, and very efficient for use in cleaning and rubbing down horses and other stock, the blade or sharp edge, either with or without the rubber, being very efficient for its purpose.

Having thus described my invention, I claim as new and desire to secure by Letters Patent—

As a new article of manufacture, the curry-comb comprising the body A and handle B, said body having an approximately convexo-convex shape, and provided along one of its longitudinal edges with teeth E and along its other longitudinal edge with a strip of rubber or elastic material, I, substantially as shown and described.

DAVID B. WEIGHTMAN.

Witnesses:
G. M. FRAZELL,
JOHN C. QUINSEY.